United States Patent
Nigon et al.

(10) Patent No.: US 7,021,132 B2
(45) Date of Patent: Apr. 4, 2006

(54) MEASURING SYSTEM FOR WHEEL PARAMETERS AND MEASURING DETECTOR FOR SUCH A SYSTEM

(75) Inventors: Frederic Nigon, Andresy (FR); Vincent Portet, Jouars-Pontchartrain (FR)

(73) Assignee: TRW France SA, Nanterre Cedex (FR)

( * ) Notice: Subject to any disclaimer, the term of this patent is extended or adjusted under 35 U.S.C. 154(b) by 219 days.

(21) Appl. No.: 10/005,091

(22) Filed: Dec. 5, 2001

(65) Prior Publication Data
US 2002/0190853 A1 Dec. 19, 2002

(30) Foreign Application Priority Data
Dec. 5, 2000 (FR) ............................................. 00 15732

(51) Int. Cl.
*B60C 23/02* (2006.01)

(52) U.S. Cl. .................. 73/146.5; 73/146; 340/442; 340/444

(58) Field of Classification Search ........ 73/146–146.8; 340/442–444
See application file for complete search history.

(56) References Cited

U.S. PATENT DOCUMENTS

| | | | | |
|---|---|---|---|---|
| 4,160,234 A | * | 7/1979 | Karbo et al. .................. 340/443 |
| 4,558,312 A | * | 12/1985 | Yonemoto et al. ........... 340/680 |
| 5,289,160 A | * | 2/1994 | Fiorletta ....................... 340/447 |
| 5,541,574 A | | 7/1996 | Lowe et al. |
| 5,573,610 A | | 11/1996 | Koch et al. |
| 5,749,984 A | | 5/1998 | Frey et al. |
| 6,062,072 A | * | 5/2000 | Mock et al. ................. 73/146.5 |
| 6,591,671 B1 | * | 7/2003 | Brown ........................ 73/146.5 |

FOREIGN PATENT DOCUMENTS

| | | |
|---|---|---|
| DE | 19924830 A1 | 11/2000 |
| FR | 2807362 A1 | 10/2001 |
| WO | WO 0119626 A1 | 3/2001 |

* cited by examiner

*Primary Examiner*—Edward Lefkowitz
*Assistant Examiner*—Jermaine Jenkins
(74) *Attorney, Agent, or Firm*—Tarolli, Sundheim, Covell & Tummino L.L.P.

(57) ABSTRACT

Measuring system for measuring at least one parameter indicative of the state of the tires of a vehicle, which comprises on each wheel a detector (12) having a parameter sensor (13) and an antenna (15) tuned to a defined frequency, and which comprises a central data processing unit (24) coupled by individual wire links (22) to fixed antennas that are installed near the wheels equipped with sensors. Each parameter sensor comprises a transponder associated with a capacitor to store the power from the associated fixed antenna. At least one of the fixed and mobile antennas is configured in such a way that the link with the other antenna corresponding to the same wheel is substantially independent of the angular position of the wheel.

26 Claims, 3 Drawing Sheets

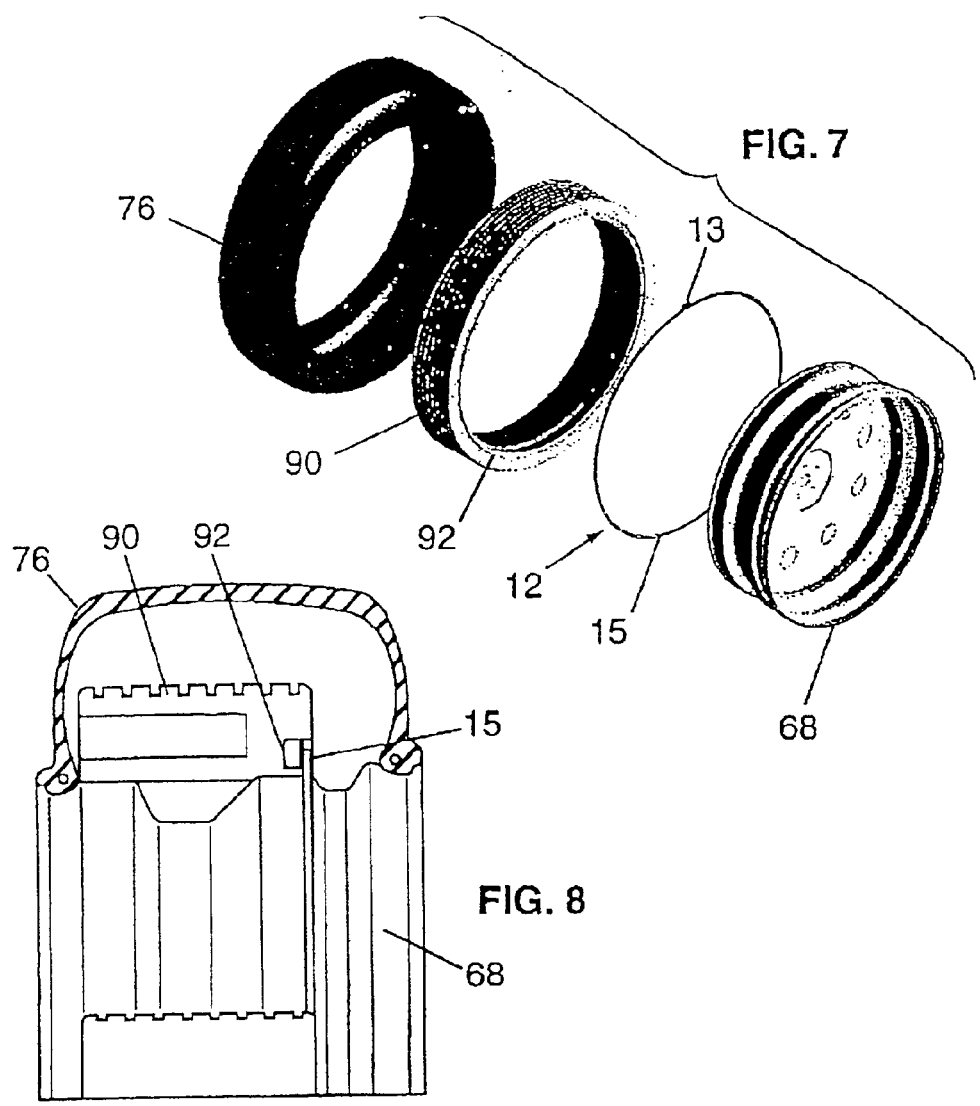
FIG. 7
FIG. 8
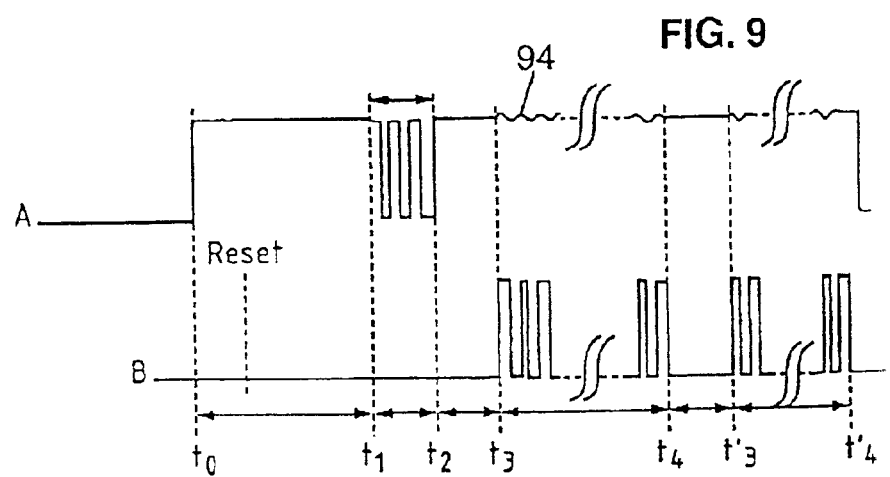
FIG. 9

MEASURING SYSTEM FOR WHEEL PARAMETERS AND MEASURING DETECTOR FOR SUCH A SYSTEM

The present invention, in general, relates to measuring systems, which measure parameters indicative of the state of the tires of a vehicle, generally at least pressure and temperature. More particularly, it relates to a system that comprises at least one measuring detector and a processor as well as a detector that can be used in such a system.

The conventional tire pressure measuring systems for an automotive vehicle that are capable of providing a warning to the driver comprise pressure sensors that communicate with the interior of the tires and constitute radio frequency transmitters linked to a receiver installed in the passenger compartment of the vehicle. These sensors are active, that is to say they comprise a consumable source of electrical energy, and they are coupled to an antenna of the receiver by a radio frequency link whose frequency generally ranges between 300 MHz and 1 GHz.

French Application FR 00 04394, to which reference is made, describes a more advantageous tire temperature and/or pressure measuring system. Each wheel is equipped with a temperature and/or pressure sensor, which at successive instances transmits a radio frequency message. It is associated with a fixed antenna installed near the axis of the wheel and the wheel rim and is coupled by a filter to a wire link or a connection with a message processor. Consequently, the radio frequency air connection required by each temperature and/or pressure sensor is very short and may be substantially the same for all the wheels. The message processing unit, which is frequently combined with a central processing unit carrying out other functions to form a common module, can then be installed anywhere on the vehicle.

These active detector systems have a certain number of limitations. The presence of the power supply increases the weight and complicates wheel balancing. In addition to the service life requirements of the power supply, the conventional use of an ultrahigh frequency link in excess of 300 MHz results in a data transmission rate of typically one per minute.

The object of the present invention, in particular, is to provide a system whose sensors do not contain a battery, i.e. are passive, and better meet the requirements in practice than prior art devices, especially by preserving a short and substantially constant distance between the sensor antenna and the fixed antenna.

Also known in the art are measuring systems that measure at least one parameter that is indicative of the state of a tire of a vehicle, comprising on each wheel a detector with a parameter sensor and an antenna tuned to a defined frequency and, on the other side, a central data processing unit coupled by individual wire links to fixed antennas, each of which is associated with a reader and arranged near one of the wheels equipped with detectors.

A system of this type, described in U.S. Pat. No. 5,541, 574, comprises a tube that is sufficiently elastic to be slipped over the edge of the wheel rim so that it rests against the wheel rim and contains the sensor and the antenna.

This arrangement has certain drawbacks. The measurement taken by the sensor is not transmitted, only a pressure drop below a threshold is communicated to the central processor. In other respects, the elasticity of the device on the wheel rim causes aging, which negatively affects the continuous operation of the system over time.

Thus, the invention, in particular, proposes a measuring system for measuring at least one parameter in which each parameter sensor comprises a transponder stage associated with a storage capacitor to store the power coming from the associated fixed antenna, and at least one of the fixed and mobile antennas takes the form of a loop, which is substantially centered over the axis of the wheel in such a way that the link with the other antenna corresponding to the same wheel is substantially independent of the angular position of the wheel, and the mobile antenna is remote from the wheel rim if the latter is made of metal.

The radio frequency specified will generally range from 100 to 500 kHz or close to 13.56 MHz. In particular, a frequency of 125 kHz, which is authorized in most countries, may be used.

In a first embodiment, the mobile antenna associated with the sensor consists of a loop carried either by the interior surface of the tire or by an annular flat-running support or, in certain cases where the wheel rim is made of plastic without conductive fillers, by the wheel rim itself. In a second embodiment, which may be combined with the first, the fixed antenna consists of a loop or a coil centered over the axis of the wheel. In this case it is preferable if the antenna is carried by the part of the wheel suspension that is integral with the wheel so that the distance from the sensor does not vary. This second embodiment lends itself to many variations. In certain cases, the sensor may even be carried by the wheel rim. In a first variant, the sensor is fixed to the face of the wheel rim that delimits the air chamber. The loop may then be formed by a simple wire and may include one or more turns. The sensor can form a clip that closes the loop and thereby fixes the detector on the wheel rim. Given that the weight of the detector is very low, the centrifugal acceleration translates into only low mechanical stresses. Instead of using a standard wheel rim, it is also possible to use a wheel rim that includes anchoring points for the sensor and the antenna. In another variant, the antenna and the sensor are fixed to the interior surface of the tire or the inner area of the tire may even be molded directly over them when the tire is fabricated. This latter solution has the advantage that it allows information identifying the tire and making it possible, for instance, to determine its origin, type, application limits, diameter and size, etc. to be stored in the tire during its manufacture. In this case, the central processing unit and the sensor are configured in such a way that the central processing unit can query the sensor to obtain identification data on the tire. The central processor can also automatically determine the location of the tire on the vehicle by determining from which fixed antenna it is receiving the identification signals.

If the wheel is designed for flat-running over a limited distance and the wheel rim comprises a reinforced elastomer or plastic support, the detector is advantageously carried by said support in which the antenna can be embedded or even encased if the manufacturing conditions permit it.

The invention also proposes a detector for a vehicle wheel intended for a measuring system to measure at least one parameter indicative of the state of the tire, comprising:
  a parameter sensor having a transponder associated with a rectifier for the received radio frequency power and a power storage capacitor and
  an antenna tuned to a certain radio frequency, formed by a loop or a coil, which together with the sensor is carried by the interior surface of the tire, by a support for flat running, or by the rim of the wheel,
said sensor comprising a memory for storing data identifying the tire, the wheel rim, or the support for flat running.

The above features as well as others will now be described in greater detail with reference to specific embodiments, which are given as non-limiting examples. The description makes reference to the accompanying drawing in which FIG. 1 is a diagram showing the general architecture of a specific system according to the invention;

FIG. 7 is an exploded view of a wheel capable of running flat, equipped with a detector for implementing the invention;

FIG. 8 is a sectional view of the wheel according to FIG. 7, and

FIG. 9 is a time chart showing one possible mode of operation of the system.

Figure 1:
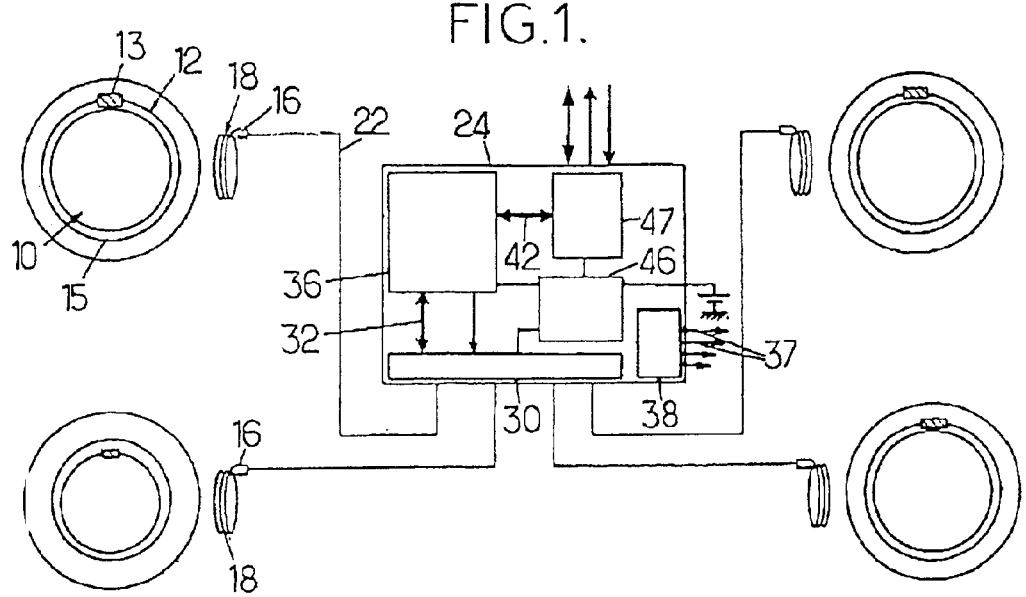

The system illustrated in FIG. 1 will first be described for the case where it is intended to provide measuring functions for temperature and pressure in the tires. As will be seen below, it may be supplemented simultaneously to take other wheel and/or tire measurements. It may also perform other functions, such as detection of wheel locking, control of vehicle stability, and remote control for the vehicle doors.

Each load wheel 10 of the vehicle, and possibly also the spare wheel, is equipped with a temperature and/or pressure detector 12, hereinafter referred to as "parameter detector," for sending a message that contains information on at least one and often two or more parameters. For this purpose, each detector 12 comprises a sensor 13 having a radio frequency transmitter-receiver, which generally operates in a band ranging from 100 to 500 kHZ or approximately 13.56 MHz, substantially lower than the UHF band (above 300 MHz) typically used in the prior art, and an antenna 15. A reader housing 16, installed near the wheel rim and generally carried by the part of the suspension integral with the wheel, is linked to an antenna 18 tuned to the transmitting frequency of the transmitter/receiver of sensor 13. A wire link 22 comprising at least a signal conductor, a line conductor and a ground conductor links the housing 16 to a central computation and processing unit 24.

The central processor 24, shown in highly simplified form in FIG. 1, comprises an input interface 30 providing multiplexing, coupling and filtering functions making it possible to send the messages from the parameter detectors to a microcontroller 36 via a link 32. A power supply unit 46 regulates the power provided by an external source (generally the vehicle battery) and supplies all of the components. The microcontroller 36 at its outputs 42 supplies alarm and identification data of the corresponding wheel to the driving circuits 47, which are capable of activating especially audio and/or visual alarms.

Housing 16 can also comprise a wheel speed sensor, which may have a conventional design. In this case, interface 30 is configured to separate the signals from the wheel speed sensors, if present on the wheels other than the spare wheel, and to send them to another element of the central processor formed by a conventional computer 38. This computer, on outputs 37, supplies instructions addressed to the brake system to release the braking pressure that the driver attempts to apply to all or only some of the wheels. In this respect, see French Patent Application FR 00 04394.

If the system is also intended to provide a remote control door locking function, the central processor is designed to send the opening and locking signals on a carrier frequency that is the same as or different from the one used for the messages exchanged with the parameter detectors.

According to the invention, the parameter detectors are passive. As a result, these detectors and the housing 16/antenna 18 assemblies are configured in such a way that they allow transmission to the detectors of the power required for their operation.

Figure 2:
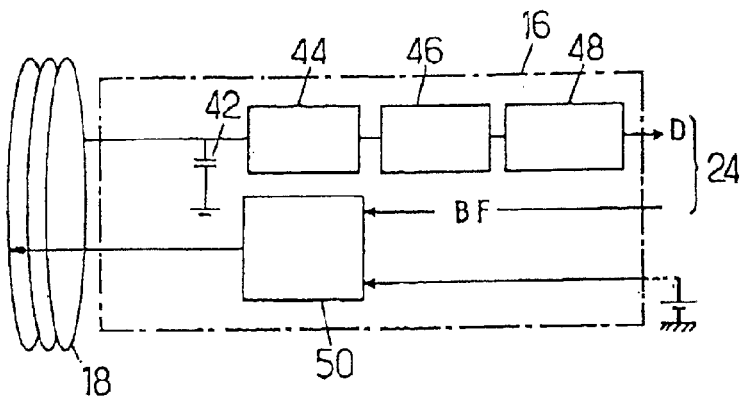
FIG. 2 is a detail diagram showing one possible arrangement of the fixed antenna and the detector installed near the wheel.

FIG. 2 is a more detailed representation of one possible implementation of a unit. Antenna 18 consists of a typically circular coil, which can be embedded in a mass of plastic material mounted to a part of the suspension which is integral with the axle around which the wheel turns. To provide an input/output circuit tuned to the radio frequency for power and information transmission, the coil is associated with a tuning capacitor 42. The receive chip comprises a peak detector 44 followed by a sampler 46 and an amplifier 48, which also effects frequency discrimination.

The power required to operate the detector is transmitted by radio frequency from housing 16. To this end, the housing comprises a power oscillator that receives a supply voltage (generally provided by the vehicle battery) either directly or from central processor 24. In one variant, shown in FIG. 2, the oscillator is replaced by an amplifier, which is controlled by a low-level LF signal originating from the central processor. The housing and the antenna may be overmolded with the same mass of encasing material to form a single part.

Figure 3:
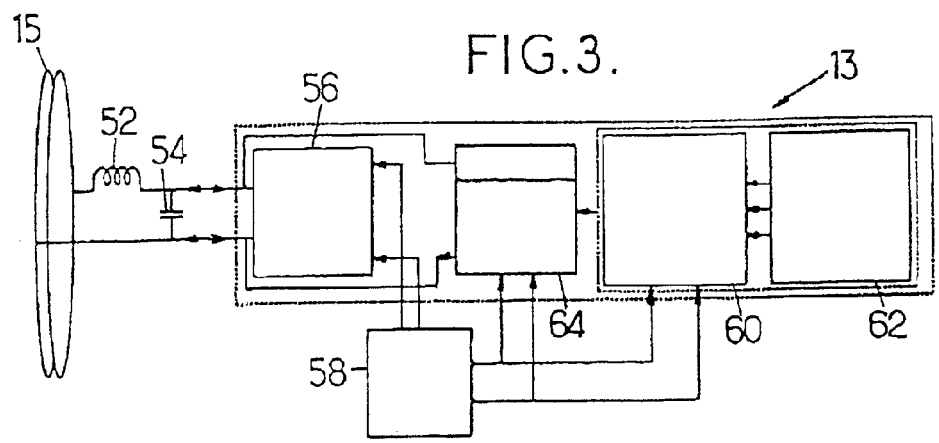
FIG. 3 is a detail diagram showing one possible configuration of a wheel sensor and its antenna.

The detector can have the configuration shown in FIG. 3. Antenna 15 is formed by a coil followed by a tuning circuit comprising a self-inductance 52 and a capacitor 54. The collected radio frequency power is rectified by a rectifier 56 and stored in a circuit 58, which is essentially formed by one or more capacitors. The power thus stored feeds a status device 60, which receives the analog output signals of the pressure and/or temperature sensors 62. The status device supplies the modulating signal to a circuit 64, which supplies the radio frequency carrier.

It may be seen that the detector is passive in the sense that it does not comprise a battery and the power required for its operation is obtained by inductive radio frequency coupling. The sensor obtains the power required for its operation through the radio frequency signal coming from the associated housing 16. The sinusoidal signal, usually 125 kHz, is "rectified" and the required power is stored in 58. The power is then used to measure pressure, temperature and/or any other wheel/tire parameters. Once the measurement has been taken, the status device 60 modulates the carrier by means of modulator 64, which modulates the impedance of the antenna. Different modulation modes may be used, including binary by opening and closing the antenna.

The housing may comprise different levels of integration. It is possible, notably, to use an application specific integrated circuit (ASIC) as status device and sensors.

Antenna 15, which is generally carried by the wheel rim or the tire, has a sufficiently large surface to ensure satisfactory coupling with antenna 18. In one variant, which is generally less advantageous, antenna 15 is localized and antenna 18 has a large diameter.

Various methods of mounting the detector will now be described. In most cases, the antenna 15 consists of a loop that may have several turns with a diameter that is at least equal to the inside diameter of the wheel rim.

Figure 4:
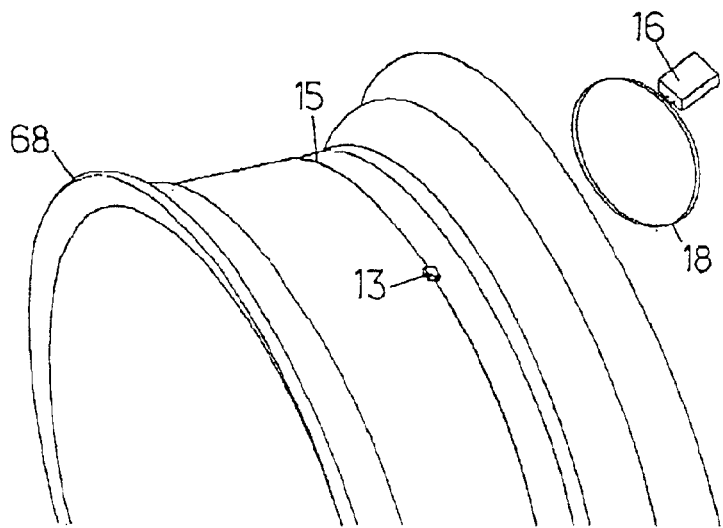
FIG. 4 is a diagram showing a variant of the embodiment of the antenna carried by a wheel.

In the case illustrated in FIG. 4, the sensor 13 and the antenna 15 are mounted or overmolded on the external face of the wheel rim 68, which is made of a non-conductive or a weakly conductive material. In the case of a single loop, the sensor may be provided with a clip allowing the loop to be closed and clamped to the wheel rim. Since the sensor does not comprise a battery, it is very light in weight and the stresses that the antenna is subject to are low. The antenna may for instance be made of a copper wire, possibly provided with a sheath, with the entire element having a diameter of generally less than 5 mm. The sensor may be piezo electric or capacitive using an internal vacuum chamber as reference. This solution is of interest only if the wheel rim is low- (or non-) conductive. This solution has the advantage that it makes it possible to identify the wheel rim and to indicate, for example, mounting errors, provided that the central processor is equipped to utilize this information.

In one variant, the wheel rim is covered with an insulating strip and the antenna is formed in thick layers by means of a silk screening process. For most applications, a capacitor 58 of approximately 1 µF is sufficient. It is made to be resistant to the temperatures occurring in operation. The status device 60 is formed by conventional logic. The arrangement of the fixed antenna 18 is optimized to ensure adequate coupling with the antenna of the parameter sensor.

Figure 5:
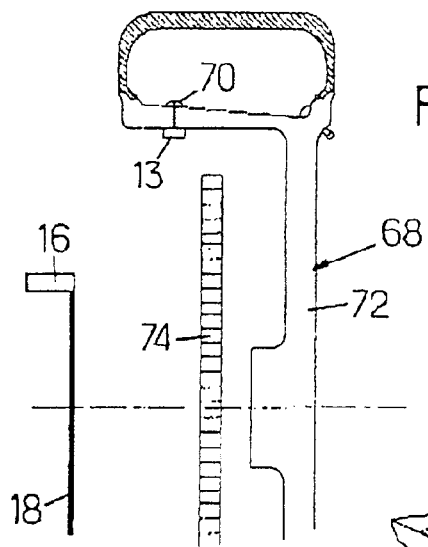
FIG. 5 is a cross-sectional view of a variant showing the respective arrangement of the antennas associated with a wheel.

In the variant shown in FIG. 5, the radio frequency antenna of the detector is integrated in the module that forms sensor 13, which is mounted to the inner face of the wheel rim 68. The antenna may be limited to a simple ferrite coil comparable to that used in existing vehicle immobilization systems. In this case, the fixed antenna 18 has a large diameter and is arranged in such a way that it is as centered as possible relative to the wheel axis. It may be installed opposite the protrusion 72 of the wheel rim relative to the brake rotor 74. This arrangement has the advantage of integrating the antenna into the sensor and placing the fixed antenna 18 at a constant distance from the detector irrespective of the angular position of the wheel.

Figure 6:
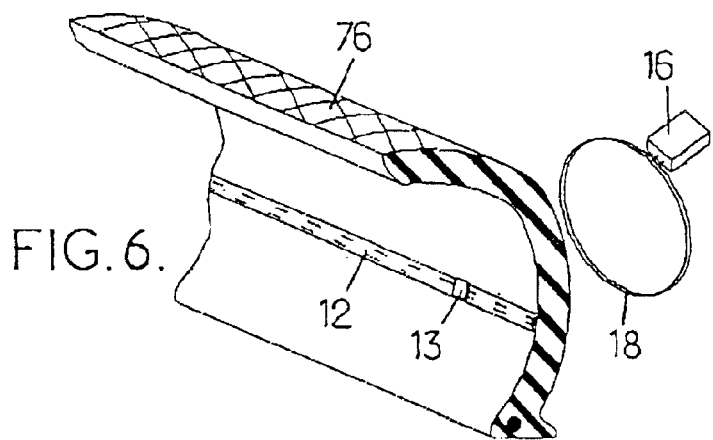
FIG. 6 shows yet another variant in which the sensor, and possibly its exterior antenna, are integrated into the tire.

Finally, the sensor 13 and the antenna 12 of the variant shown in FIG. 6 are carried directly by the interior surface of the tire 76. The antenna and sensor unit may be molded as a single part that is glued to the interior surface of the tire 76. In one variant, the assembly is overmolded by the tire itself and the components are capable of withstanding the vulcanization temperature.

This latter solution has the advantage that it provides tire identification and indicates any possible errors, provided that the central processor is capable of utilizing the information entered in the sensor memory during manufacture. This information may have various functions:

tire identification (manufacturer, manufacturing date, lot number, etc.), tire type (summer, winter, studded, etc.), recommended pressure dimensions (diameter, width), rated speed, load limit, for tires capable of running flat for a defined maximum distance, speed limit when the tire is flat and maximum permissible distance.

In a variant similar to that shown in FIG. 5, the sensor integrated in the tire may have an integrated localized antenna. In this case, the antenna of the fixed portion is installed symmetrically over the axis of rotation of the wheel, as shown in FIG. 5, to ensure a constant distance relative to the sensor.

Several separately identifiable units may be arranged on different circumferences along the periphery of the tire to indicate any deformation of the latter. This type of information may be used by an active suspension system, ride control, or a wheel antilock system. The deformation of a tire may especially indicate wear and may be used by the central processor to provide warning of excessive wear.

In yet another variant, which can be used for a sensor that is either carried by the wheel rim or by the tire, the sensor is provided with a rewritable memory making it possible to update the information over the life of the tire, for instance the distance traveled, the maximum speed attained, etc.

The sensor may also comprise elements sensitive to other parameters, such as radial and/or tangential acceleration. Communication at a relatively low radio frequency, e.g. 125 kHz, permits continuous transmission of information.

The method of mounting the detector shown in FIGS. 7 and 8 is intended for wheels capable of running flat. The shape of the wheel rim 68 is such that a support made of a non-conductive or a slightly conductive material 90 can be mounted so that it rests against two spaced-apart cylindrical zones of the wheel rim. This support may be reinforced by a cord fabric and/or a filler fabric. In the case shown, the periphery of the support is provided with circumferential grooves. The mobile antenna 15 associated with sensor 13 is carried by or integrated in the flat-running support. It may also be housed in a recess of the support and glued to or even embedded in the support while nevertheless allowing the pressure in the tire 76 to act on the sensor.

If the support has a straight U section as shown in FIGS. 7 and 8, the detector can notably be installed in a recess 92 provided at the bottom of the U where it is subject to only reduced mechanical stresses while still being exposed to pressure and temperature.

The fixed antenna, which can be a loop as shown in FIGS. 1 and 3, or localized, is advantageously spaced at a distance from the wheel axis that is substantially equal to the radius of antenna 15.

Irrespective of the implementation method used, the life of the device is not limited by that of a battery. The measuring rate of the parameters indicative of the current state of the tire, such as pressure and temperature, is limited only by the period required for each communication, which can be less than 20 ms (while the active sensor systems operating at UHF generally use a refresh rate on the order of 1 min to save the battery). Any rupture can consequently be detected instantaneously. Since the communication distance by radio relay channel is short and well defined, it is not necessary to use an anti-collision message format. There is no interference between the signals coming from different detectors since the length of the radio-electric link between a detector and the corresponding fixed antenna is shorter by more than an order of magnitude than the distance to the other fixed antennas. If the wheels are rotated, the system will automatically make the necessary correction. Finally, if the detector is carried by the tire, the invention provides essential information to the tire manufacturer and, for the vehicle manufacturers, the advantage of automatic tire identification and a method to prevent tire pairing defects.

The central processor can communicate with the detectors by different methods, i.e., by automatic transmission on the part of the detector as soon as its power source reaches a sufficient voltage, or by polling with the aid of a defined code. The invention makes it possible to push back the temperature operating limits as well as the mechanical stresses compared to the prior art system with integrated battery.

Various polling and exchange methods between the detector and the central processor are possible. FIG. 9 shows an example in which a binary code is used to exchange data.

The shape of the carrier coming from the fixed antenna is indicated by line A and the response by line B.

A polling-response sequence starts with the application of the non-modulated carrier, e.g. 125 kHz, starting from an instant t0. This unmodulated carrier is maintained up to an instant t1 to charge the capacitor and trigger re-initialization (reset). If necessary, the reference of the requested measurement to be taken by the detector and/or identifier of the transponder (unit carried by a wheel) is transmitted between t1 and t2. The polled sensor takes the measurement between t2 and t3. Between t3 and t4 it gives the result of the measurement, for instance in Manchester code. This transmission may be effected, for instance, by opening and closing the loop of the mobile antenna so as to modify the apparent impedance of the fixed antenna 18, as indicated at 94. The transmission measurement sequence may be repeated as indicated at t4-t'3-t'4.

The invention may also be used for aircraft tires, taking into account the specific demands on said tires, which occur only at long intervals but then subject them to very harsh conditions, notably during landing. The possibility of taking a measurement at a very high rate, typically 50 Hz, is then an important advantage, notably to detect any rupture instantaneously and immediately to supply information regarding excessive temperatures that may lead to rupture, whether the landing gear is extended or retracted.

In an extended variant of the system, the central processor and the reader/detector unit of the fixed part are capable of successively polling several sensors/transponders present at different locations on the wheel. A first application is the measurement of pressure, temperature or acceleration. The wheel may also comprise additional transponders and/or sensors, such as an identification transponder circuit integrated into the tire, for instance of the type described in U.S. Pat. No. 5,573,610. In this case of tire identification, the transponder circuit comprises an integrated low-frequency antenna. Communication with the fixed reader/detector takes place only when the transponder is close by, at low speed. The system can then verify the tire characteristics.

An equivalent functionality may be obtained if the wheel rim comprises an identification transponder.

In a further developed method, the transponder integrated in the tire may be associated with a tire deformation sensor, for instance of the type described in U.S. Pat. No. 5,749,984. In this case, the transponder circuit is advantageously associated with a loop antenna of the type shown in FIG. 6 so as to ensure continuous communication with the sensor at a high data refresh rate. Means for measuring lateral, longitudinal and/or vertical acceleration connected to the antenna may also be provided.

The following table presents different multiple transponder/sensor combinations.

| Configuration | Sensor for Pressure/Temperature (and/or Other Measurements) | Identifying Transponder (and/or Measurement Sensor) | Identifying Transponder (and/or Measurement Sensor |
|---|---|---|---|
| 1 | support for running flat | tire | wheel rim |
| 2 | wheel rim | tire | support for running flat |
| 3 | tire | wheel rim | support for running flat |

What is claimed is:

1. Measuring system for measuring at least one parameter that is indicative of a state of a tire of a vehicle, comprising:
   on each wheel, a detector having a parameter sensor and a detector antenna tuned to a defined frequency,
   a central data processing unit coupled by individual wire links to fixed antennas, each of the fixed antennas having an associated wheel and each of the fixed antennas being arranged near its associated wheel,
   the parameter sensor comprising a transponder with a capacitor for storing power, the power being transmitted to the parameter sensor of the detector from an associated fixed antenna,
   at least one of the associated fixed antenna and the detector antenna being a loop that is substantially centered over an axis of the associated wheel so that a communication link with the other one of the associated fixed antenna and the detector antenna corresponding to the associated wheel is substantially independent of an angular position of the associated wheel, and
   the detector antenna being insulated from a rim of the associated wheel when the wheel rim is made of metal,
   the associated wheel also carrying at least one of lateral, vertical and longitudinal acceleration measuring means, each of which is connected to the detector antenna.

2. System as claimed in claim 1, characterized in that the detector antenna is formed by one of a loop and a coil that is embedded in the interior of the tire.

3. System as claimed in claim 1, characterized in that the detector antenna is formed by one of a loop and a coil that is integrated into the tire.

4. System as claimed in claim 1, characterized in that the parameter sensor and the detector antenna of the detector are fixed on an annular support for running flat carried by the wheel rim.

5. System as claimed in claim 1 characterized in that the associated fixed antenna is formed by one of a loop and coil that is centered over the axis of the wheel and is carried by a part of a wheel suspension that is integral with the associated wheel.

6. System as claimed in claim 1 characterized in that the detector antenna and the parameter sensor of the detector are fixed to the interior surface of the tire.

7. System as claimed in claim 1 characterized in that the detector antenna and the parameter sensor of the detector are embedded in the interior of the tire.

8. System as claimed in claim 1 characterized in that an interior zone of the tire is directly molded over the detector antenna and the parameter sensor of the detector.

9. System as claimed in claim 1 characterized in that the parameter sensor comprises a memory in which identification information for identifying at least one of the tire, the wheel, and an annular support is stored during manufacture.

10. System as claimed in claim 1 characterized in that the detector antenna is in the form of one of a loop and a coil, the detector antenna being followed by a tuning circuit having an inductor and a capacitor, a rectifier and a circuit with at least one power storage capacitor, as well as a status device, which receives output signals of the parameter sensor and supplies a modulating signal to an impedance modulation circuit of the detector antenna.

11. System as claimed in claim 1 characterized in that the parameter sensor and the detector antenna are fixed to the wheel rim, the wheel rim being made of one of a non-conductive material and a weakly conductive material.

12. System as claimed in claim 1 characterized in that the parameter sensor and the detector antenna are integrated in the wheel rim, the wheel rim being made of one of a non-conductive material and a weakly conductive material.

13. System as claimed in claims 1 characterized in that the central data processing unit is configured successively to poll several parameter sensors carried by the associated wheel.

14. Measuring system for measuring at least one parameter that is indicative of a state of a tire mounted on a wheel of a vehicle, comprising:

a detector having a parameter sensor and a detector antenna tuned to a defined frequency, the detector being mounted to a rim of the wheel and the detector antenna extending circumferentially around the wheel rim and contacting the wheel rim, the parameter sensor comprising a transponder for transmitting signals indicative of the sensed parameter via the detector antenna;

a central data processing unit mounted on the vehicle for receiving the transmitted signals and for, in response to receiving the transmitted signals, providing indications of the sensed parameter; and a fixed antenna coupled by a wire link to the central data processing unit, the fixed antenna being arranged near the wheel, power for operating the detector being transferred from the fixed antenna to the parameter sensor through the detector antenna, the parameter sensor having a capacitor for storing power received from the fixed antenna until use, the wheel rim being made of one of a non-conductive material and a weakly conductive material.

15. System as claimed in claim 14 wherein the fixed antenna is formed by one of a loop and coil that is centered over the axis of the wheel and is carried by a part of a wheel suspension that is associated with the wheel.

16. System as claimed in claim 14 wherein the parameter sensor comprises a memory in which identification information of the wheel is stored.

17. System as claimed in claim 14 wherein the parameter sensor and the detector antenna are fixed to the wheel rim.

18. System as claimed in claim 14 wherein the parameter sensor and the detector antenna are integrated into the wheel rim.

19. System as claimed in claim 14 wherein the wheel is made of plastic.

20. Measuring system for measuring pressure within a tire mounted on a wheel of a vehicle, comprising:

an annular support mounted on the wheel within the tire for enabling operation of the wheel when the tire is flat;

detector having a parameter sensor and a detector antenna tuned to a defined frequency, the detector being secured to the annular support at a location spaced away from the wheel, the parameter sensor sensing air pressure within the tire and a transponder of the detector transmitting pressure signals having an air pressure value portion that indicates the sensed air pressure within the tire; and central data processing unit mounted on the vehicle and coupled to a fixed antenna for receiving the transmitted pressure signals and for providing indications of the sensed air pressure wherein the fixed antenna is associated with the wheel and is arranged on the vehicle near the wheel, power for operating the detector being transferred from the fixed antenna to the parameter sensor through the detector antenna, the parameter sensor having a capacitor for storing power received from the fixed antenna until use.

21. System as claimed in claim 20 wherein the detector is configured to sense air pressure within the tire and transmit pressure signals when the tire is inflated away from the annular support for enabling operation when the tire is flat.

22. System as claimed in claim 20 wherein the detector is embedded in the annular support.

23. System as claimed in claim 20 wherein the annular support includes a recess located in a side surface of the annular support, the detector being secured in the recess of the annular support.

24. System as claimed in claim 20 wherein the wheel is formed from metal and the annular support insulates the detector antenna from the wheel.

25. System as claimed in claim 20 wherein the detector antenna is formed by one of a loop and a coil.

26. System as claimed in claim 20 wherein the associated fixed antenna is formed by one of a loop and coil that is centered over the axis of the wheel and is carried by a part of a wheel suspension that integral with the wheel.

* * * * *